United States Patent
Thacher

(10) Patent No.: US 7,606,579 B2
(45) Date of Patent: Oct. 20, 2009

(54) AUTO MAPPING THROUGH LOCATION BASED TRIGGERS

(75) Inventor: Jeffery W. Thacher, Roswell, GA (US)

(73) Assignee: Discrete Wireless, Inc., Atlanta, GA (US)

( * ) Notice: Subject to any disclaimer, the term of this patent is extended or adjusted under 35 U.S.C. 154(b) by 502 days.

(21) Appl. No.: 11/164,683

(22) Filed: Dec. 1, 2005

(65) Prior Publication Data
US 2007/0129082 A1 Jun. 7, 2007

(51) Int. Cl.
H04W 24/00 (2009.01)
H04W 24/10 (2009.01)
G01C 21/00 (2006.01)
G01C 21/26 (2006.01)
G01C 21/32 (2006.01)
G08G 1/123 (2006.01)
G08G 1/127 (2006.01)
G08G 1/137 (2006.01)

(52) U.S. Cl. .............. 455/456.1; 455/456.2; 455/456.6; 455/457; 701/207; 701/208; 701/213; 340/990; 340/995.1; 340/995.12

(58) Field of Classification Search .............. 455/414.2, 455/456.1, 456.6, 340, 457; 701/207, 208, 701/211, 213; 342/350–359, 450; 340/990–999, 340/989
See application file for complete search history.

(56) References Cited

U.S. PATENT DOCUMENTS

| | | | | |
|---|---|---|---|---|
| 4,891,761 A | * | 1/1990 | Gray et al. | 701/219 |
| 5,214,757 A | * | 5/1993 | Mauney et al. | 715/751 |
| 5,760,742 A | * | 6/1998 | Branch et al. | 342/457 |
| 6,154,152 A | * | 11/2000 | Ito | 340/988 |
| 6,169,515 B1 | * | 1/2001 | Mannings et al. | 342/357.1 |
| 6,377,210 B1 | * | 4/2002 | Moore | 342/357.09 |
| 6,401,068 B1 | * | 6/2002 | Cherveny et al. | 704/275 |
| 6,526,352 B1 | * | 2/2003 | Breed et al. | 701/213 |
| 6,636,802 B1 | * | 10/2003 | Nakano et al. | 701/208 |
| 6,704,649 B2 | * | 3/2004 | Miyahara | 701/208 |

(Continued)

OTHER PUBLICATIONS

Authors: Arunas Stockus, Alain Bouju, Frederic Bertrand and Patrice Boursier□□Title: Integrating GPS Data within Embedded Internet GIS□□Published: Nov. 1999□□Source: ACM.*

(Continued)

*Primary Examiner*—Nick Corsaro
*Assistant Examiner*—Tangela T. Chambers
(74) *Attorney, Agent, or Firm*—Smith Frohwein Tempel Greenlee; Gregory Scott Smith

(57) ABSTRACT

An automated map generator that can be used for creating new maps for uncharted areas, augmenting uncompleted maps, or creating maps for areas that are changing dynamically. One or more mobile devices include location based technology that operates to identify a current location for the mobile device and report that location to the map creation application. If the location of the mobile device is within an active mapping region, the map creation device can instruct the mobile device to report its location on a more frequent basis and then commence to map out the route to the mobile device. As the route is mapped out, a new map of the territory is created. As subsequent devices enter into that area (including navigational systems), the updated mapping information is provided to the device and can then be augmented by future location readings or can simply be used by the device.

6 Claims, 11 Drawing Sheets

U.S. PATENT DOCUMENTS

| | | | |
|---|---|---|---|
| 6,829,484 B1* | 12/2004 | Kimoto et al. | 455/456.1 |
| 6,970,782 B2* | 11/2005 | Watanabe et al. | 701/200 |
| 7,031,836 B2* | 4/2006 | Branch | 701/213 |
| 2001/0027375 A1* | 10/2001 | Machida et al. | 701/209 |
| 2006/0028377 A1* | 2/2006 | Abraham | 342/357.12 |

OTHER PUBLICATIONS

Authors: Harsha Tummala and Joel Jones☐☐Title: Mobility Support and Location Awareness: Developing Spatially-Aware Content Management Systems for Dynamic, Location-Specific Information in Mobile Environments☐☐Published: Sep. 2005☐☐Source: ACM.*

Authors: Chieko Arai, Naoko Matsuda and Masaaki Shikada☐☐Title: Management of Mapping in Local Government Using Remote Sensing and the Real Time GIS☐☐Published: Jun. 2002, pp. 3145-3147, vol. 6☐☐Source: IEEE.*

Authors: Anindya S. Paul and Eric A. Wan☐☐Title: Dual Kalman Filters for Autonomous Terrain Aided Navigation in Unknown Environments☐☐Published: Aug. 2005, pp. 2784-2789, vol. 5☐☐Source: IEEE.*

Title: Red Hen Unveils Mobile for Mediamapper Elite☐☐Published: Jul. 2003, vol. 13, Iss. 7☐☐Source: ProQuest.*

Authors: Jim Engelhardt☐☐Title: Mobile GIS Takes IT to the Field☐☐Published: Sep. 2002, vol. 12, Iss. 9, pp. 16 & 18☐☐Source: ProQuest.*

* cited by examiner

US 7,606,579 B2

AUTO MAPPING THROUGH LOCATION BASED TRIGGERS

CROSS-REFERENCE TO RELATED APPLICATIONS

The present invention is related to, and incorporates herein by reference, U.S. patent application entitled GEO-FENCE LOCATION-SPECIFIC EQUIPMENT STATUS BASED TRIGGER DIRECTED CONTENT DELIVERY, filed on the same day as the present application and having and assigned Ser. No. 11/164,679.

BACKGROUND OF THE INVENTION

This invention is related to the fields of geocentric location devices and systems, and distributed geocentric location based systems and their application to cartography and, more particularly to utilizing geocentric location based systems to map out un-charted or modified topographies and utilizing the created mappings within a navigation system.

The earliest direct evidence of the creation of maps is a Babylonian clay tablet which shows the earth as a flat, circular disk. It is estimated that this tablet was created around 1000 B.C. Thus, we can safely say that for at least 3000 years, mankind has had a keen interest in not being lost. Today, cartography is so important that in the United States, we have a governmental agency that is dedicated to the subject—the National Geospatial-Intelligence Agency (NGA), which, prior to 2004 was known as the National Imagery and Mapping Agency (NIMA). The mission of the NGA is to provide timely, relevant, and accurate geospatial intelligence.

The good news for NGA, and the many commercial companies that are involved in the creation, publication and dissemination of mapping information is that we continuously are changing the face of planet Earth. As a result of these constant changes, we have the benefit of purchasing elaborate world or country specific atlases at greatly reduced prices—if we are willing to rely on last years version. For most of us, such an outdated atlas or map will pose absolutely no problems. However, there are industries that not only require up-to-date mapping information, but actually demand near real-time provision of current mapping information. An example of such an industry is the construction industry, as well as the various industries that operate in and around new construction sites.

A revolutionary technological advancement that has not yet been fully utilized and appreciated in the cartography industry, is location identification and tracking technology. The most commonly known system that has reached widespread deployment is the Global Positioning System or GPS. GPS technology includes multiple geostationary satellite systems that provide location and timing signals to earth bound GPS receivers. Such technology can greatly improve the ability for companies to keep track of their assets or mobile forces.

As described in the above-listed related patent application, prior to the advent of wireless communications, service companies that relied on the use of deployed work forces typically would distribute work orders at the beginning of a work day and then deploy their work forces. If information pertaining to entries in a particular person's work order changed, the company or dispatcher would not be able to alert the worker unless the worker called in during the day or, if the company was able to track the worker down by calling the various locations that the worker should be visiting in accordance with his or her work orders. With the widespread deployment of wireless communications including pagers, two-way radios and cellular technologies, the ability to keep track of and update the work orders for various workers was greatly enhanced.

The above-listed related patent application is directed towards exploiting the technology developments in location identification technology and wireless communications to help improve the efficiency of a deployed work force oriented business. In addition, it discloses a system to identify the location of a company's deployed assets and provide the deployed asset with work order information relevant to a job tied to the identified location or a particular piece of equipment at that location. Furthermore, the above-listed related patent application discloses an automated dispatcher capability that can track deployed forces, automatically adjust work orders to more efficiently service customers, collect and provide current status and information for various projects in a real-time manner, and provide status relevant information to field workers based on measurements and status information obtained from the field. However, operating within an unmapped area, such as a new construction territory, in which roads, addresses and other mapping information is not available can be problematic. In fact, in a new construction zone, the cartography can change on a daily, and even an hourly basis. Tracking deployed work forces in such an environment can prove to be exceedingly problematic. Thus, there is a need in the art for a solution to obtain current, near real-time mapping information within new construction areas. There is also a need in the art for a system that can exploit the current mapping information within an automatic dispatch scenario. There is also a need in the art to create mapping information that can be utilized to supplement mapping information within navigation systems, such as in-vehicle navigation systems.

BRIEF SUMMARY OF THE INVENTION

The present invention addresses the above-identified needs in the art, as well as other needs in the art through providing a system that relies on a plurality of mobile units that communicate with a centralized system and provides geocentric information about an uncharted or an active mapping region and, utilizing such geocentric information to create maps for the active mapping region. The mobile units include technology that enables the mobile devices to identify their physical location at any particular time, and wireless communication technology to enable constant communication with the control system that, among other things, operates a map creation application. In operation, mobile devices are deployed along with the work forces for a particular company but could also be dedicated units that are mobilized solely for the purpose of creating maps.

In one embodiment, the present invention includes a system for updating and creating mapping information for an active mapping region. The system includes two primary components: a control system and one or more mobile devices. Each of the mobile devices includes a GPS receiver and a radio transceiver. The mobile devices communicate with the control system through the radio transceiver. In operation, the mobile devices periodically obtain a current location reading from the GPS receiver and then transmit the current location reading to the control system. The control system receives the current location reading from a mobile device and determines if the current location reading falls within an active mapping zone. If the current location reading is within in active mapping zone, the control system begins updating the mapping information using the last reading and subsequent location readings from the mobile device. In addition, the control system may request the mobile device to increase the frequency at which the location readings are provided. This aspect of the invention increases the granularity of detail in the mapping information. Once the location reading falls outside of the active mapping region, the control system requests the mobile device to revert to normal reporting mode and commences with normal operation.

Another aspect of the present invention is the creation of mapping information that can be loaded into a navigational system, such as an in-vehicle navigational system, to supplement the commercially available or standard mapping information embedded within the navigational system. Advantageously, this aspect of the present invention allows for navigational systems to be updated with current mapping information as changes are made within uncharted or active mapping regions. In operation, once new mapping information for a particular region is loaded into the navigational system, when the navigational system enters into that particular region, the new mapping information is either used instead of the previously loaded mapping information, or is overlaid on the previous mapping information.

These and other aspects, embodiments and features of the present invention are more fully described in the following description, figures and claims.

DETAILED DESCRIPTION OF THE INVENTION

The present invention, among other things, operates to create updated mapping information for new construction areas, but can also be employed in creating mapping information for any uncharted area, as well as simply verifying, augmenting or updating mapping information for any area. More specifically, in one embodiment of the present invention, work forces that are deployed within an area to be mapped are equipped with location identification equipment, such as a GPS receiver, and optionally, with wireless data communication equipment. Thus, as a work force moves into an area to be mapped, the entrance into the unmapped region can be detected, and as the work force member travels within the area, new mapping information can be obtained, stored, and used in the future by other work force entities entering into that area.

Although for illustrative purposes, the present invention is described within particular embodiments or applications, it should be appreciated that the present invention is not limited by these examples or applications. Rather, the present invention and aspects of the present invention can be incorporated into a variety of embodiments and applications without departing from the spirit and scope of the present invention. The primary application that is described herein is for the deployment of work forces within a new construction area. Turning now to the figures, in which like references identify like elements throughout the several view, embodiments, aspects and features of the present invention are described more fully.

Figure 1:
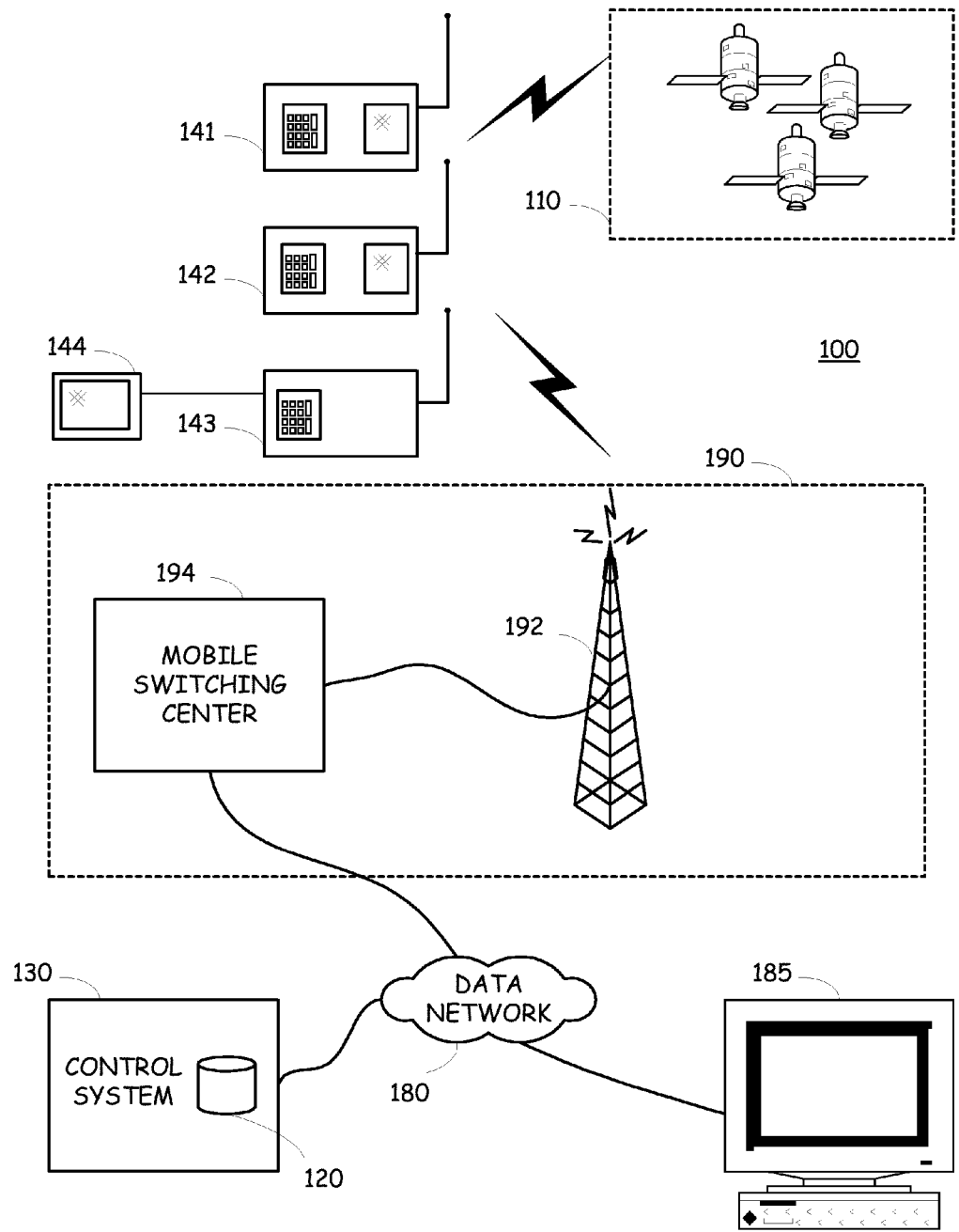
FIG. 1 is a system diagram of the various components and devices of an exemplary system that could be utilized to implement embodiments of the present invention.

FIG. 1 is a system diagram of the various components and devices of an exemplary system that could be utilized to implement embodiments of the present invention. The system 100 includes various components that are communicatively coupled to each other using various communication techniques. A geostationary orbiting satellite positioning system 110 operates to provide signals to mobile devices 141, 142 and 143. These satellite signals can be used by the mobile devices to identify the location of the mobile devices. The operation of such a typical geostationary orbiting satellite positioning system is well known to those skilled in the art. The most common satellite system that operates to provide such information is the Global Positioning System or GPS. The GPS is a constellation of twenty-four well-spaced satellites that orbit the Earth at 10,600 miles above sea level. The satellites are spaced at such intervals and altitude that for any given point on the Earth, at least four satellites will be communicatively seeable, or above the horizon. Each satellite in the GPS constellation includes a computer system, an atomic clock, and a transmitter. The satellites continuously transmit a data stream that identifies the current position of the satellite and the current time. Through the detection and decoding of these GPS signals, the mobile units are able to identify the longitudinal and latitudinal coordinates at which the mobile device is located. However, it should be appreciated that the present invention is not limited to operation with the GPS and other location technologies can also be utilized. Thus, when the term GPS is used within the context of this description, it is synonymous with other compatible location determining technologies unless otherwise stated.

The mobile devices 141, 142 and 143 are equipped to receive and/or determine location information, and also to transmit information to a dispatch and control or central system 130 through a communications medium. In the illustrated embodiment, the communications medium is a cellular telephone network utilizing technology such as GSM with GPRS, CDMA, TDMA, or similarly capable technologies. This technology enables the communication of data between the mobile devices and the control system. The cellular based data transmissions from the mobile devices 141, 142 and 143 are received by the mobile system 190 at antenna 192 and are provided to the mobile switching center 194. The mobile switching center then provides the received data transmissions to the control system 130 through a data network 180.

The control system 130 is also functional to transmit data to the mobile devices 141, 142 and 143 through the data network 180 and the cellular system 190. The control system 130 includes a database system 120 that houses, among other things, data utilized for various embodiments of the present invention. The mobile devices 141 and 142 are shown as including a display and a key pad. Such elements can be included in various embodiments of the present invention in addressing various aspects and functions of the invention and allow a user of the mobile device to review information received from the GPS transmitters and the control system, and to enter additional information to be provided back to the control system 130. However, it will be appreciated that other embodiments may not require such elements. The mobile device 143 is shown as interfacing to an external display device or an external device 144 that includes a display, such as a navigational system. In this embodiment, the control system can provide data to the external device 144 through the mobile device 143, or in other embodiments may directly provide data to the external device 144. Although not illustrated, it should be appreciated that the mobile devices may also interface to other data devices such as scanners, digital cameras, audio devices, analog to digital converters, an automobile data bus, measurement equipment, digital clocks, or other various devices.

The control system 130 includes the database system 120. The database system 120 can contain a variety of information depending on the various embodiments of the present invention. The database system 120 and the control system 130 may also be accessed via computer 185. Such a system allows the information in the database and information regarding the various mobile devices to be accessed from any computer system connected to the control system 130 through the data network 180. It should be appreciated that although FIG. 1 describes an exemplary environment that is suitable for the present invention, the present invention is equally applicable to other environments and is not limited to the illustrated environment. Rather, the illustrated environment has been provided as a non-limiting example of the operation of the present invention.

Figure 2:
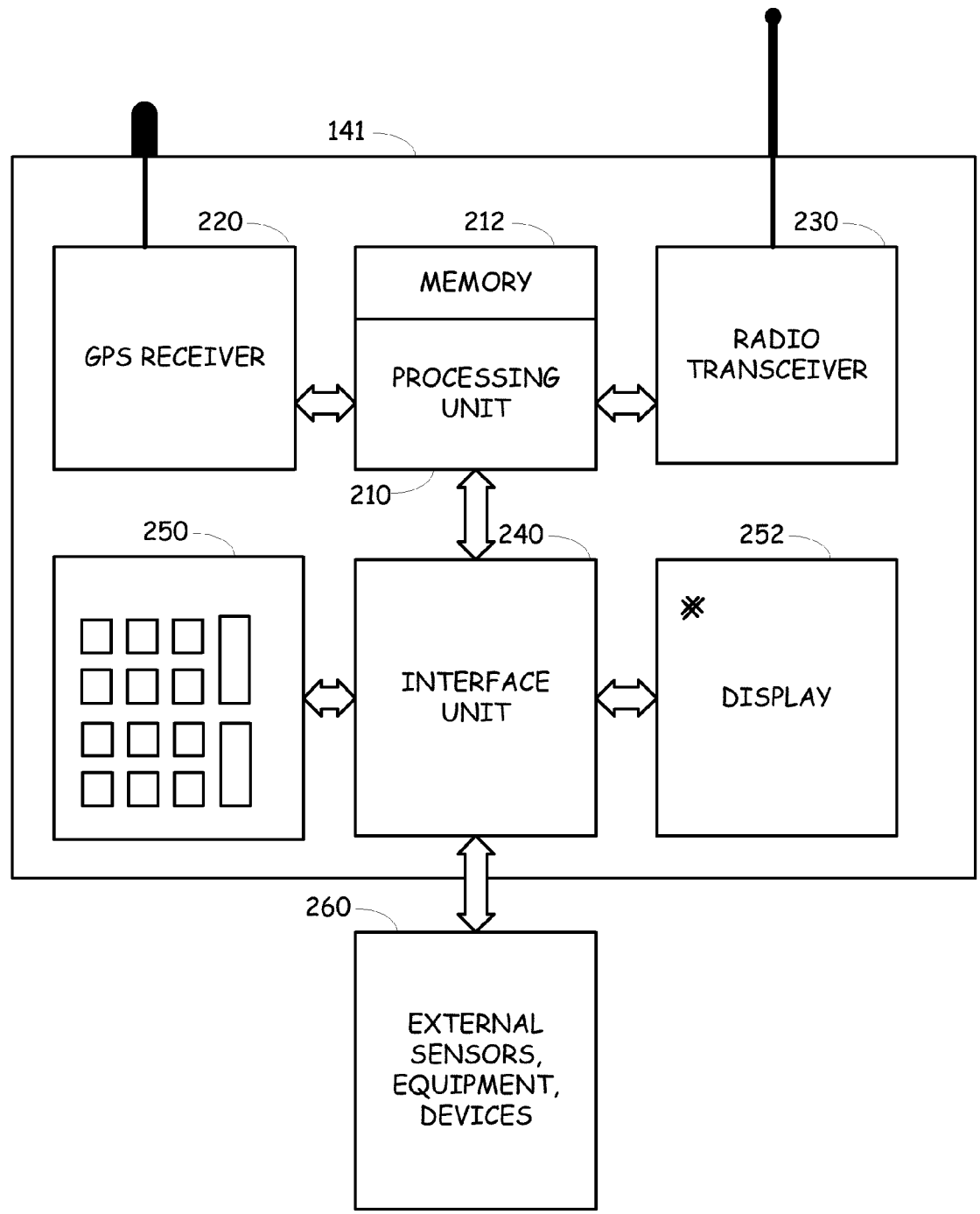
FIG. 2 is a block diagram of an exemplary mobile device suitable for embodiments of the present invention.

FIG. 2 is a block diagram of an exemplary mobile device suitable for embodiments of the present invention. The mobile device 141 is shown as an all-in-one self-contained box that includes various external connectors. Having all of the functional components within a single box allows for rapid and ease of installation but is not a requirement of the present invention. The mobile device can be constructed to be small and lightweight for easy transportation. The overall operation of the mobile device 141 is controlled by a processing unit 210 that includes memory element 212 for housing the software or firmware for defining the operation of the device, as well as temporary variables and status indicators. The mobile device 141 includes a GPS receiver 220 and a radio transceiver (transmitter and receiver) 230. Under control of the processing unit 210, the GPS receiver 220 can be enabled to detect signals from the GPS satellites and determine the location of the mobile device 141. The location information is then provided to the processing unit 210 for storage in memory 212 or for immediate transmission through radio transceiver 230. The processing unit 210 can interface to various input and/or output devices through an interface unit 240. For instance, the processor can receive key actuations from optional keypad 250 and display status or other information on optional display 252. The processing unit 210 can interface to external devices 260, measurement equipment, analog inputs, digital inputs or instrumentation through the interface unit 240. For instance, a measurement device may provide a digital or analog signal to the processing unit for storage, processing or otherwise acting upon.

One aspect of the present invention is the creation of mapping information that can be loaded into a navigational system, such as an in-vehicle navigational system, to supplement the commercially available or standard mapping information embedded within the navigational system. External equipment 260 can be such a navigational system and as such, receive updated mapping system through the mobile device 141. Alternatively, the mobile device 141 may be embedded within, or also operate as a navigational system. The processing unit 210 may also receive information through the radio transceiver 220 such as status, data and operational commands. As an example, the mobile device 141 may receive a request from the control system 130 to provide the current location of the mobile device 141. In response to receiving the request through the radio transceiver 230, the processing unit enables the GPS receiver 220 to decode the current location. This information is then transmitted to the control system 130.

As has been described, the general scope of the present invention is to provide a real-time or near real-time gathering of data to accumulate mapping information in new areas or rapidly changing areas, such as construction zones. One aspect of the present invention is the automatic detection of entering into a non-mapped zone and automatically generating mapping information for the zone. Another aspect of the present invention is detecting the entry into a non-mapped zone or a partially mapped zone and providing current mapping information. Another aspect of the present invention is augmenting partially mapped zones with additional information as subsequent information is received from participants entering the area.

In general, there are two types of systems or methods for devices to talk to each other. These general methods include: (a) polling or (b) interrupt driven. In a polled environment, a master or controller periodically or a' periodically communicates with another device, such as a slave device, to ensure the device is still active, to determine if the device needs any input or actions to be taken, or simply to provide information to or extract information from the device. In an interrupt driven system, devices autonomously communicate back to a master or central system either based on a schedule or the occurrence of an event. There are advantages and disadvantages to both techniques and the bottom-line deciding factor typically turns on the particular application or usage. In the present invention, a central system, the control system, is contacted by multiple mobile devices in an autonomous manner—interrupt driven. However, it should be understood that embodiments of the invention may also utilize polled communication initiated by the control system.

In the present invention, the interrupts, or more aptly termed, triggers, that are associated with this aspect of the present invention and invoke communication from the various mobile devices fall into two categories: (a) triggers initiated by the mobile device receiving GPS or location information and (b) triggers initiated by operation of the mobile device or a peripheral to the mobile device or operator initiated triggers. The details of these triggers are more thoroughly described in the above-referenced patent application which is incorporated herein by reference and thus, will not be fully described herein.

However, the mobile device based triggers are described within the context of this specification in that they are the most obviously related to the present invention. The mobile device initiated triggers, although predominately based on GPS information, can be generated from a variety of circumstances. For instance, each time the mobile unit 141 is moved (which can be detected through the GPS receiver 220), the mobile device 141 may trigger an alert to the control system 130. In another embodiment, the control system 130 may load location parameters into the mobile device 141 through a radio transmission to the radio transceiver 230. These parameters can define alert zones. If the mobile device 141 enters into or approaches one of the alert zones (or exits an alert zone) the mobile device 141 can transmit a message to the control system 130. This aspect of the present invention can be used to notify the control system 130 as to the current location of the mobile device 141, the transportation routes of the mobile device 141 and when the mobile device 141 is in an area that requires attention.

Figure 3A:
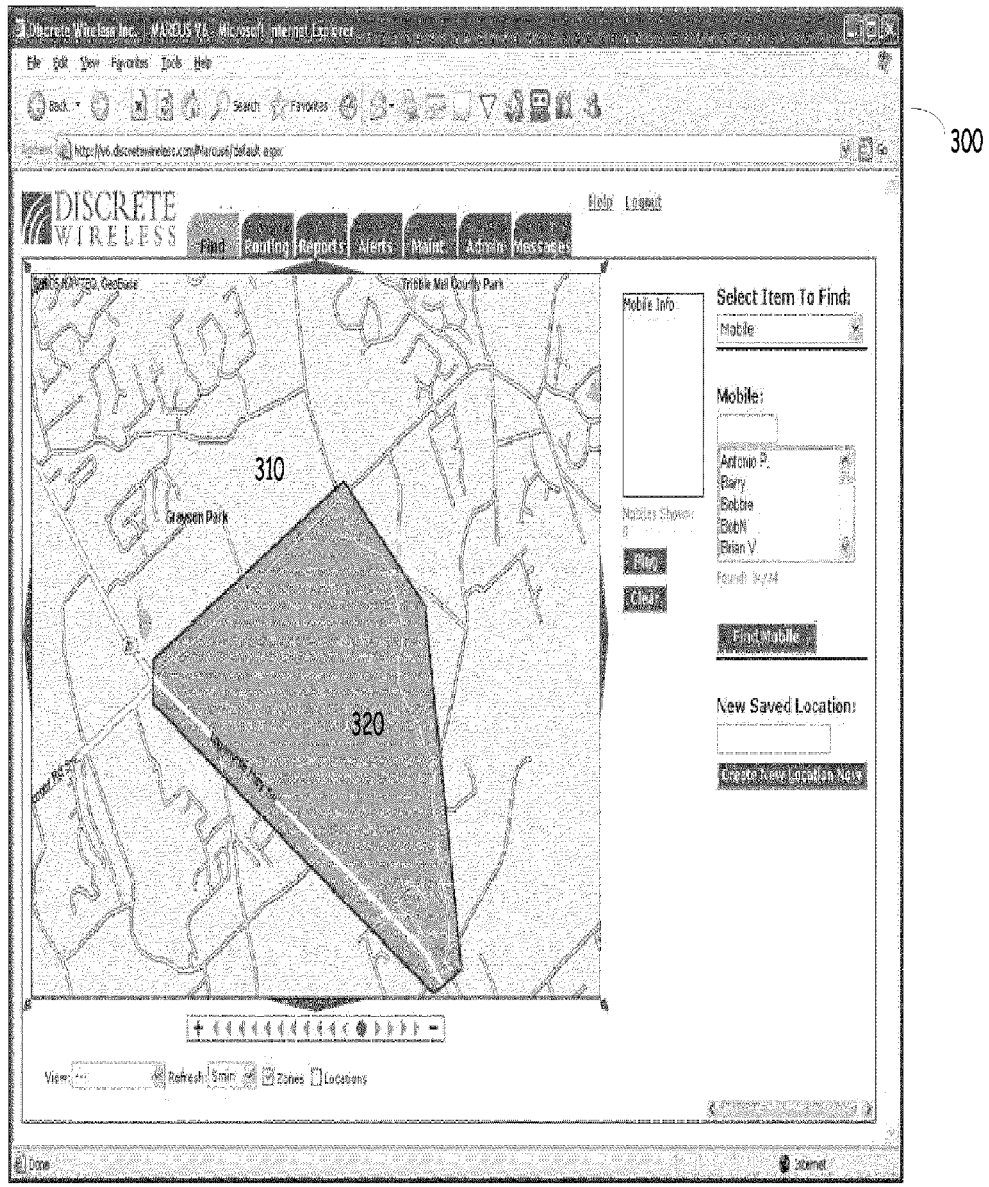
FIG. 3A is a screen shot of a mapping application that is displaying a map that includes a mapped region and an unmapped region.

FIGS. 3A-3G are screen shots of a GUI in different states for an exemplary embodiment of the present invention operating on control system 130. FIG. 3A shows a screen shot 300 that includes a mapped region 310 and an unmapped region 320. The mapped region 310 is an area that mapping information is available for, and can be obtained from one or more sources either through a purchase or for free. In addition, such information can be included in the purchase of other systems such as a GPS location system. The unmapped region 320 is an area in which either commercially available mapping information is not available or, currently available mapping information is inaccurate due to previous changes or pending changes in the topography of the region. For instance, commercial mapping information may be readily available for a large farming area but, if that farming area is being developed into a rural neighborhood, then the mapping information will require changing. As illustrated in the unmapped region 320, several roads are identified; however, there is an area that does not include any roads or landmarks. Such an area could be undeveloped land or farm land. In defining the unmapped region 320, an administrator of the system can create a geo-fence that defines the boarder of the unmapped region 320. The control system 130 (or the host computer) creates a new map of the geo-fenced area and the host system will then continually update this map with new data that is provided to the host system 130. When a vehicle or work force entity enters into this region, the host system 130 will send the latest version of this map to the mobile device.

Figure 3B:
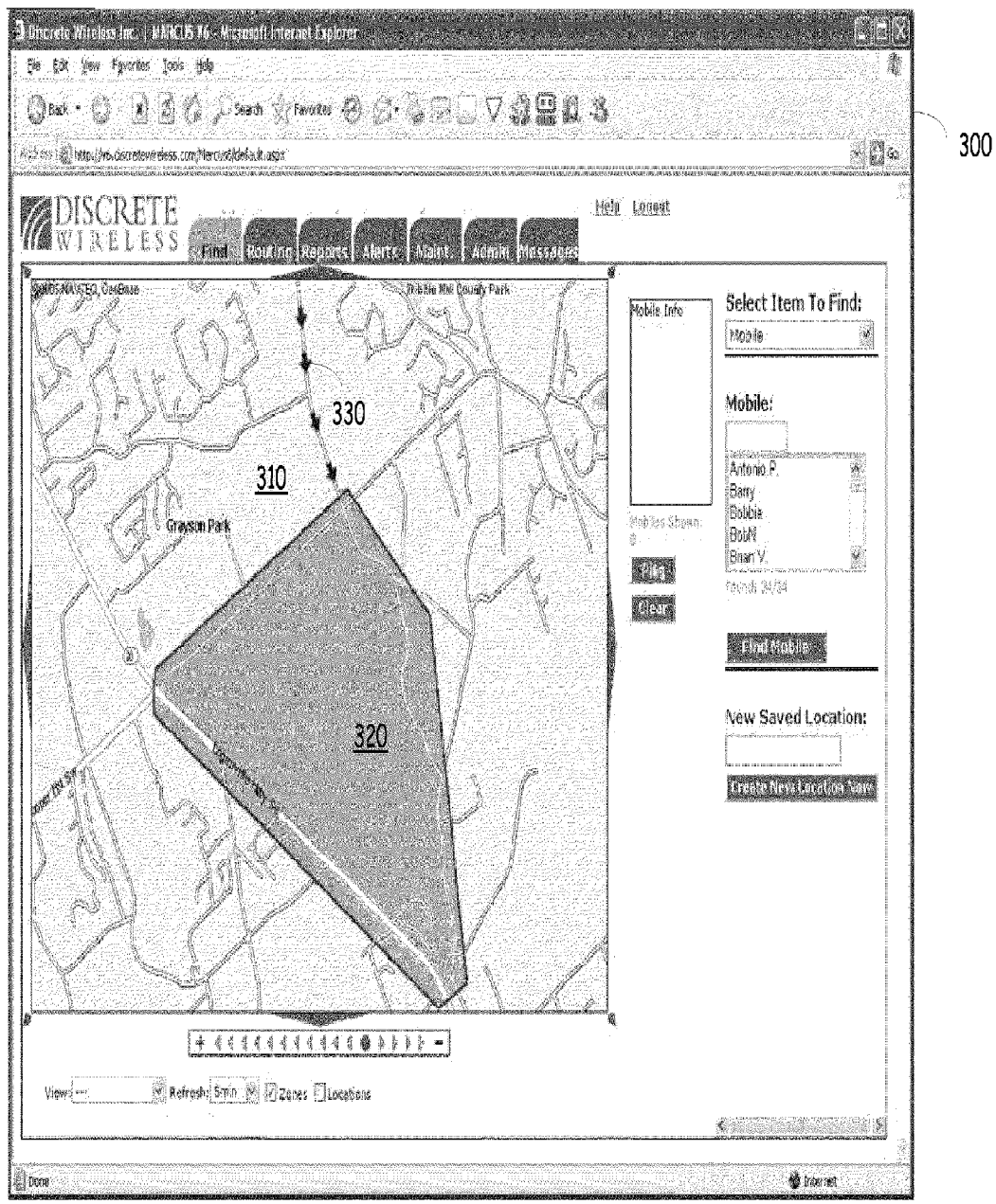
FIG. 3B is a screen shot of a mapping application that is displaying a map and showing a vehicle or mobile device approaching the unmapped region along a previously mapped road.

FIG. 3B shows a vehicle or mobile device approaching the unmapped region 320 along road 330. While operating in this region, the mobile device can rely upon commercially available or previously generated mapping information. Thus, no actions are taken regarding updating the unmapped region 320 until the mobile device enters that region.

Figure 3C:
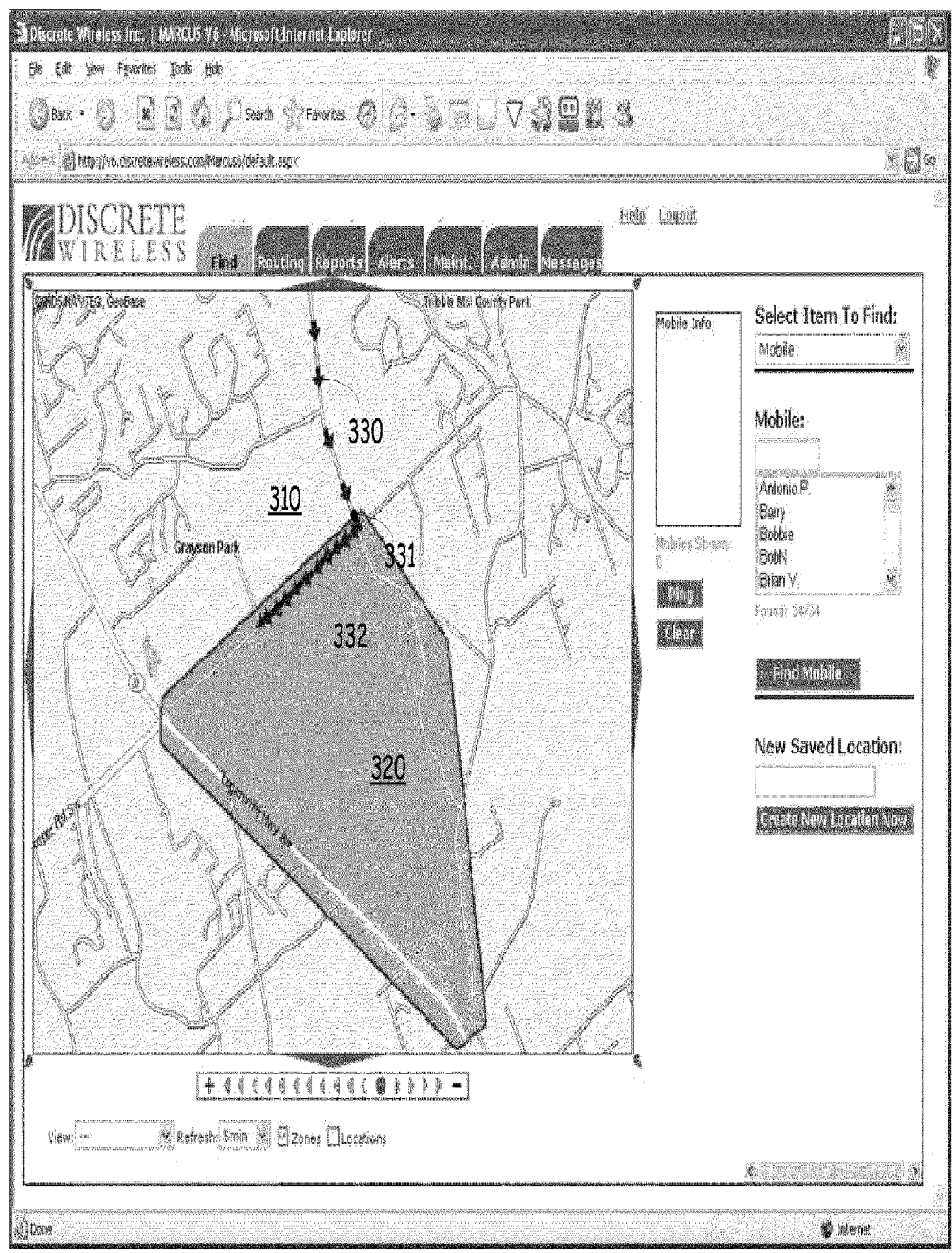
FIG. 3C is a screen shot of a mapping application that is displaying a map and showing vehicle from FIG. 3B entering into the unmapped region at a particular point and then continuing along previously mapped road in the unmapped region.

FIG. 3C show the same vehicle entering into the unmapped region 320 at point 331 and then continuing along road 332. As can be seen from observing the screen shot 300, the road 332 is a part of previously mapped regions; however, as will be shown, additional roads are going to be created that branch off of road 332 and thus, road 332 was included within the unmapped region 320. The mobile devices entry into the unmapped region 320, in accordance with one embodiment of the present invention, is detected when the mobile device reports its current location to the host system 130 and the host system has that location corresponding with the unmapped region 320.

When the mobile device enters into the unmapped region 320, the host system sends a command to the mobile device 141 to place the mobile device 141 into a rapid monitor mode. While operating within the rapid monitor mode, the radio transceiver begins sending location information on a more frequent basis. For instance, in an exemplary embodiment, the mobile device 141 may send the location information as frequently as less than a second or once every few seconds. In an exemplary embodiment of the present invention, the location information may include latitude and longitude values. The location information could include additional information such as the time of day and date that the location measurement was taken, altitude of the mobile device, speed of the mobile device, photographs of the present location, accelerometer measurements, directional information, etc. The increase in the frequency of reporting the location information is indicated in FIG. 3C by the density of the directional arrows. It should be appreciated that the present invention does not require that the frequency of the measures be increased once the mobile device 141 enters into the unmapped region 320, nor that any particular measurement frequency be applied—although these aspects may be considered novel and non-obvious in and of themselves. However, it will also be appreciated that using a less frequent reporting time within the mapped region 310 and a more frequently within the unmapped region 320 has several benefits. First of all, while traveling in the mapped region 310, the mobile device is simply reporting its present location rather than generating mapping information. A reduced reporting frequency while operating in the mapped region 310 helps to alleviate processing overload by the host system 130. In addition, increasing the reporting frequency while operating within the unmapped region 320 advantageously allow for more detail to be provided in assimilating mapping information for the unmapped region 320.

Figure 3D:
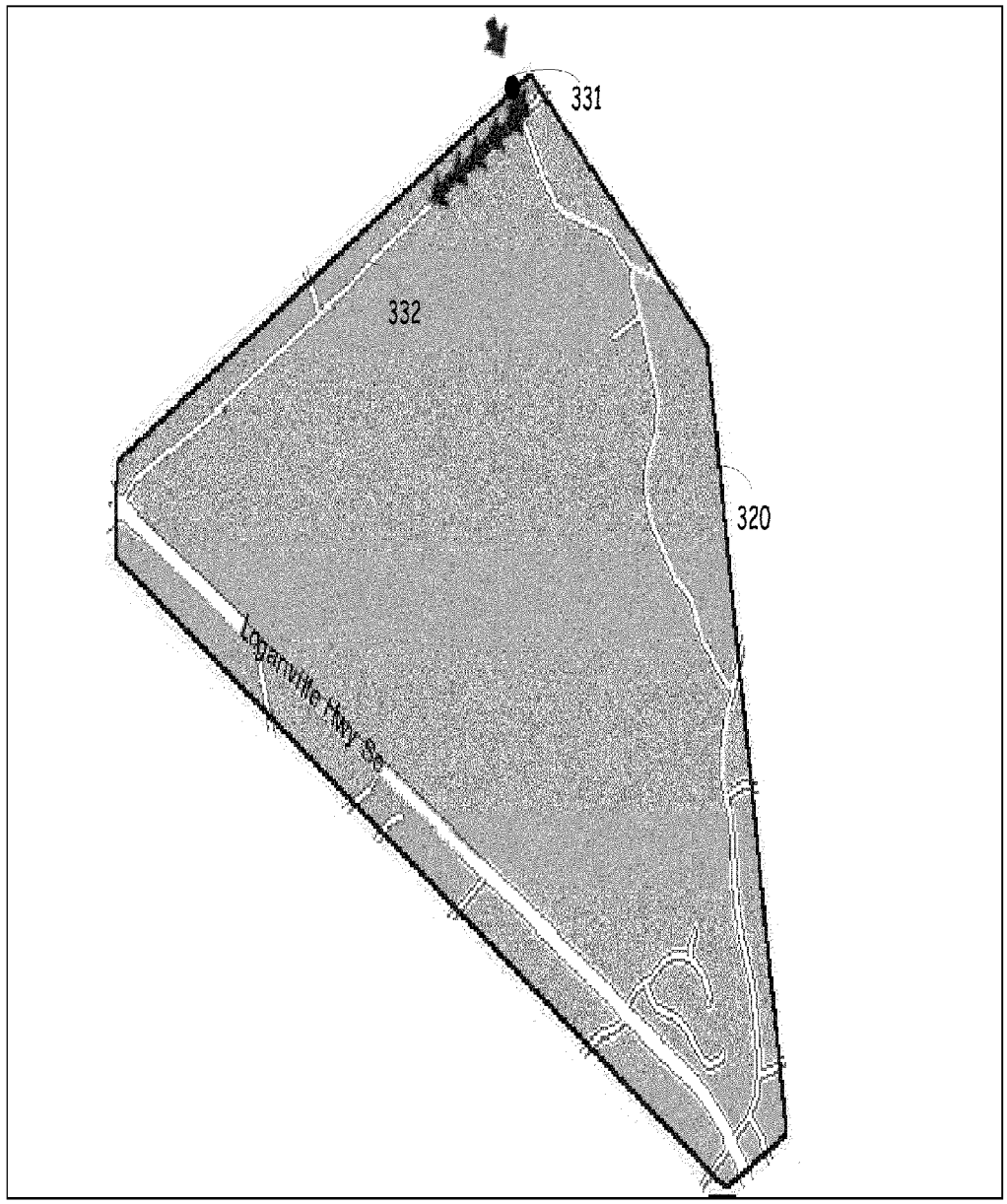
FIG. 3D is a screen shot of a mapping application that is displaying an enlarged view of the unmapped region of FIG. 3C.

FIG. 3D is an enlarged view of the unmapped region 320. Once the host system 130 places the mobile device 141 into rapid monitor mode, the host system 130 sends the new geo-fenced unmapped region 320 to an onboard monitor. As long as the mobile device 141 is traveling along existing roads (or previously mapped roads) no further actions are taken by the host system 130. However, as soon as the mobile device 141 turns off of an existing road, the host system 130 begins saving the location measurements from the mobile device 141 and uses this information to update the new map being generated for the unmapped region 320.

Figure 3E:
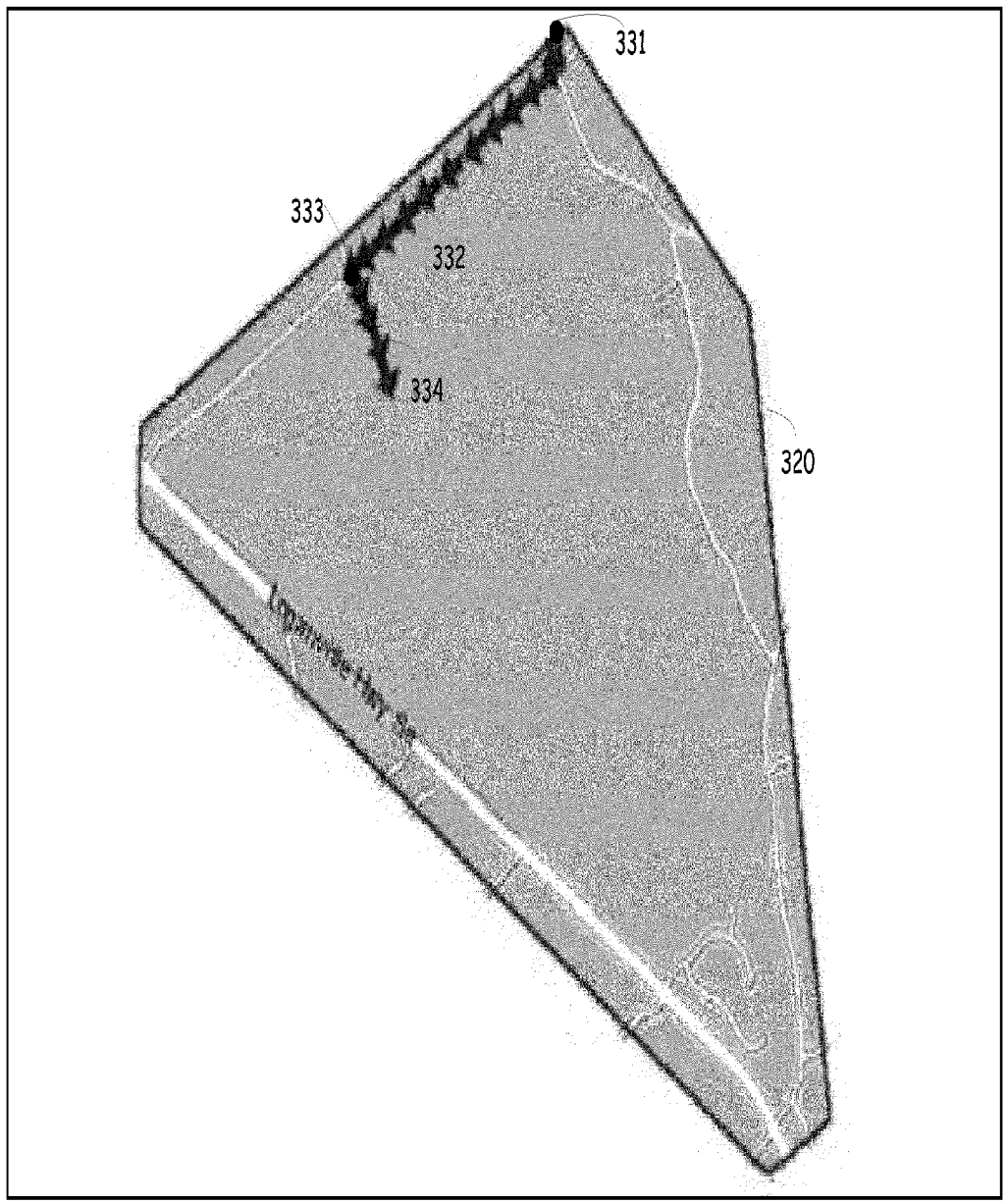
FIG. 3E is a screen shot of a mapping application that is displaying a map and showing the vehicle from FIGS. 3B-3C turning off of the previously mapped road.
Figure 3F:
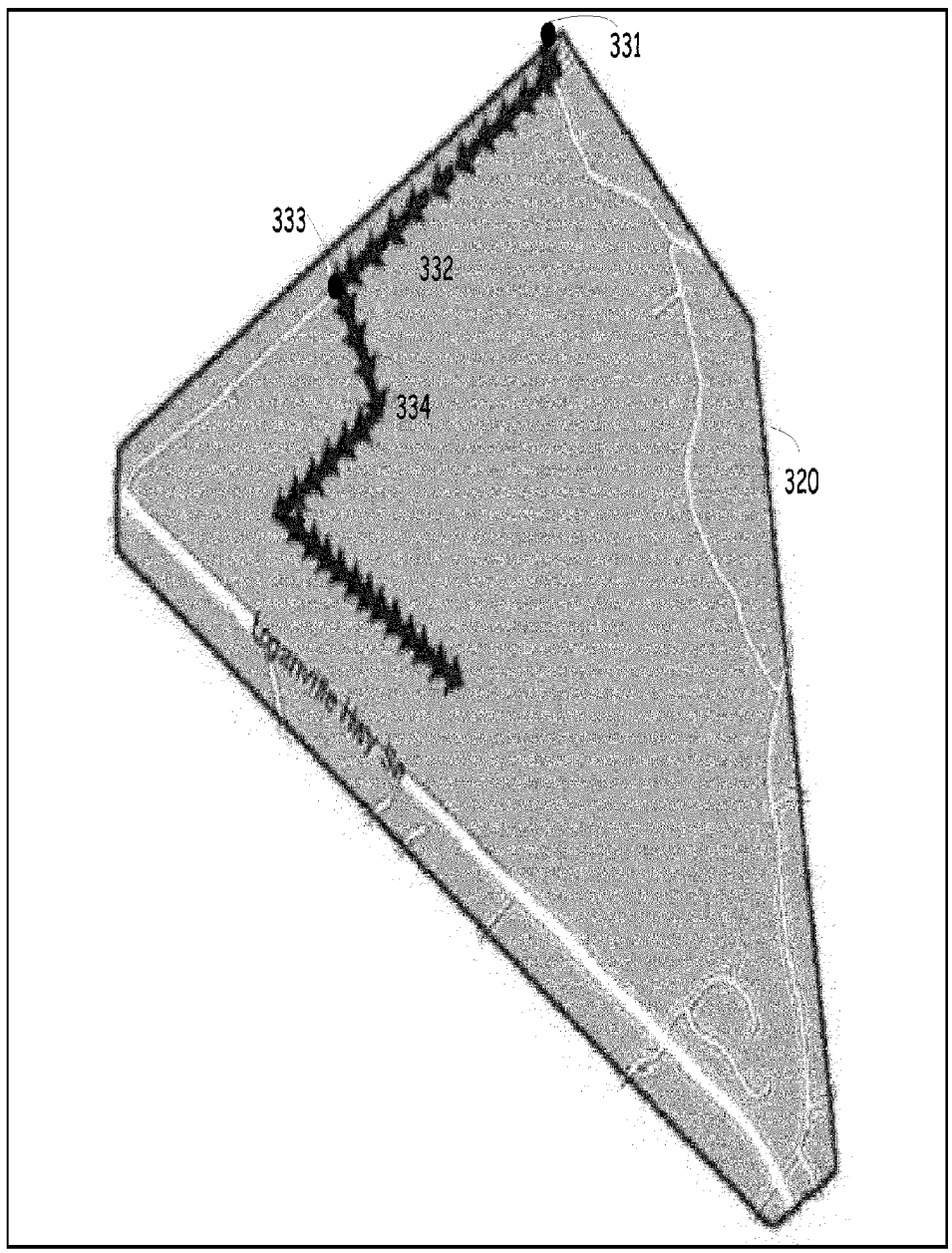
FIG. 3F is a screen shot of a mapping application that is displaying a map and showing additional turns and roads that are added into the map of the unmapped region.
Figure 3G:
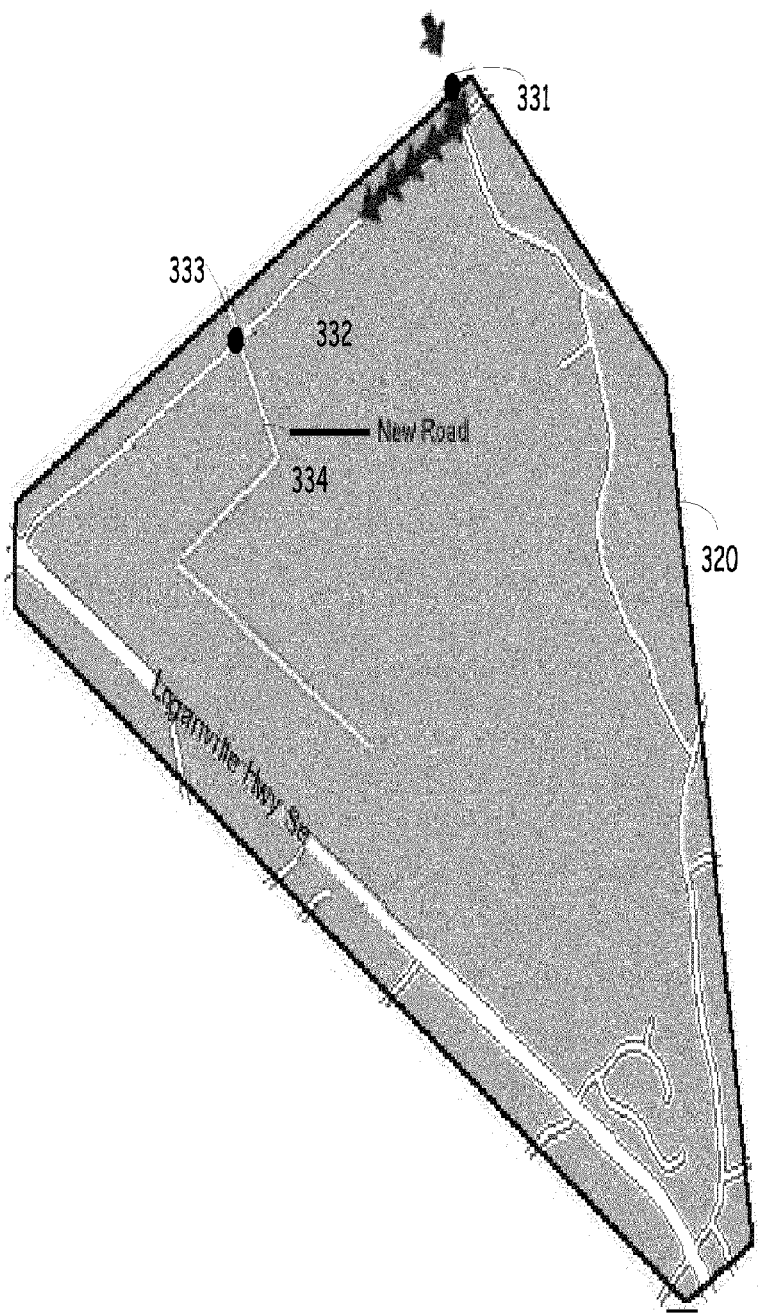
FIG. 3G is a screen shot of a mapping application that is displaying a map and showing an updated version of the new map for the unmapped region that is downloaded to subsequent visitors to the unmapped region.

FIG. 3E is a screen shot of a mapping application that is displaying a map and showing the vehicle from FIGS. 3B-3C turning off of the previously mapped road. As illustrated, at point 333, the mobile device 141 makes a left turn off of the previously mapped road 332 and begins traveling along unmapped route 334. These measurements could be taken by a scraper that is clearing an area for the new road or it may be other construction vehicles traveling down a cleared path for a new road or, even a utility truck driving down a recently paved unmapped road as non-limiting examples. In any case, the location information is provided to the host system 130 and the host system 130 operates to update the new map of the unmapped region 320. The host system uses this new information to define a new road to be placed into the new map. FIG. 3F shows additional turns and roads that are added into the map of the unmapped region 320. Once the mobile device 141 exits the unmapped region, or the mobile device ceases reporting addition location information, or the mobile device 141 begins traveling on the newly defined roads, the mapping information is saved. Each subsequent mobile device that enters into the unmapped region or geo-fenced region 320 will receive the latest version of the new map. Similar to creating mapping information for the unmapped region 320, the hosting system 130 is notified of the mobile device entering into the unmapped region by receiving a location report for the mobile device. Once this is detected, the new map is transmitted to the mobile device and the mapping information is readily available. If the mobile device turns off of existing roads, new mapping information will be generated and provided to the hosting system 130. Thus, the new map can be created by one or more mobile devices that travel through the unmapped region 320. FIG. 3G shows an updated version of the new map for the unmapped region 320 that is downloaded to subsequent visitors to the unmapped region 320.

It will also be appreciated that as new mapping information is created, this mapping information can immediately be assimilated and then downloaded to other mobile devices that are within the unmapped region, as well as to the mobile device that is generating the new mapping information and even other navigational systems that could benefit from using the updated mapping information. Thus, mobile devices can receive near real-time updates of the unmapped region 320.

As previously stated, this aspect of the present invention can be utilized in creating updated mapping information for new construction zones but there are many other applications in which the invention can also be used. A few non-limiting examples include, mapping out planting information within farm land, updating mapping information as farm land is developed, mapping out routing information in a war zone scenario, mapping out boating lanes or shipping channels, etc.

Figure 4:
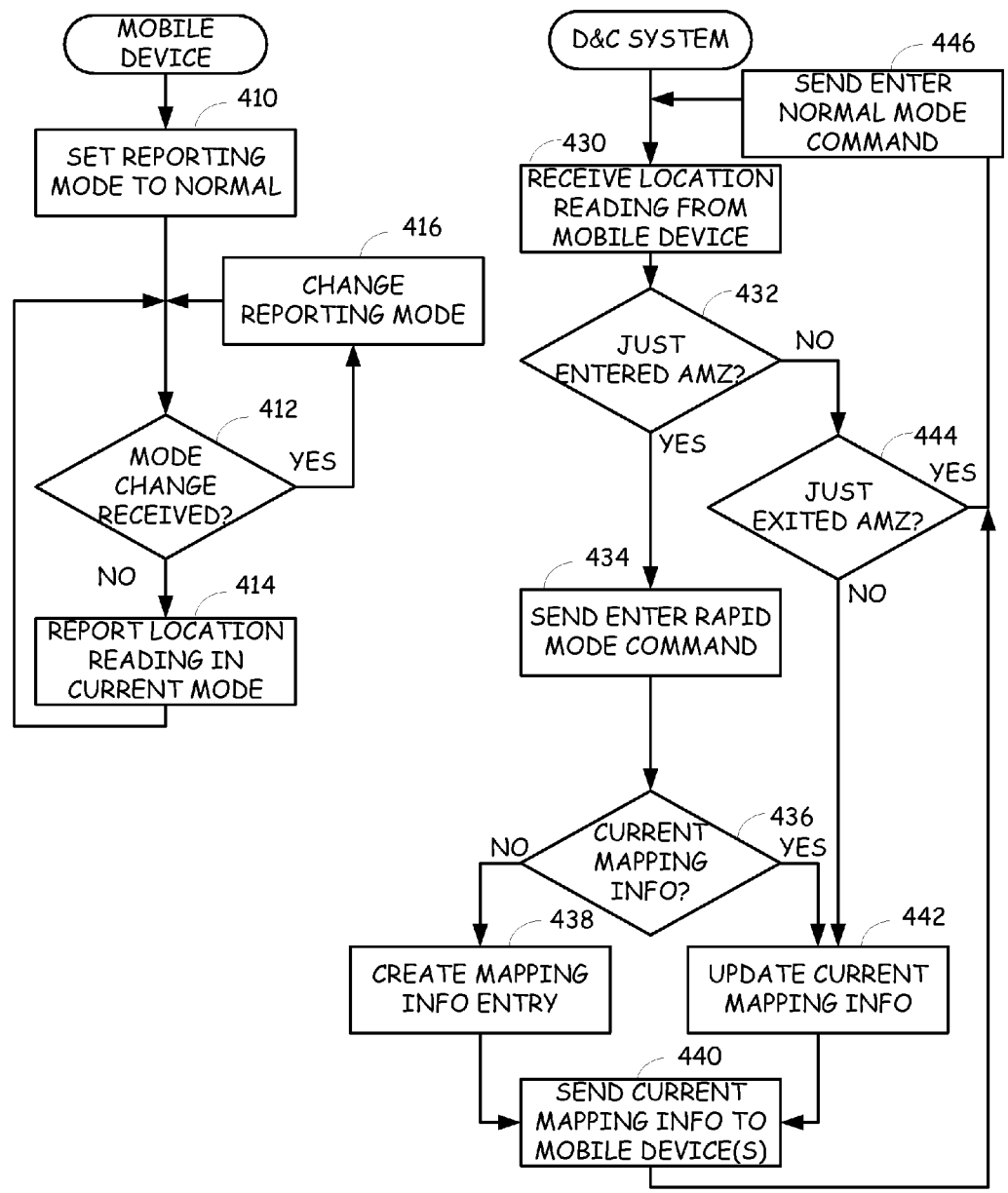
FIG. 4 is a flow diagram summarizing the operation of an exemplary embodiment of the present invention.

FIG. 4 is a flow diagram summarizing an exemplary embodiment of the present invention. The operations of both a mobile device and the control system are described. At step 410, a mobile device begins operation in normal mode, presumably outside of a geo-fenced area identified as an unmapped zone, or otherwise termed as an active mapping zone, however, if the mobile device commences operation within an active mapping zone, the illustrated embodiment is still operable.

At decision block 412, the mobile device determines if it has received a mode change request. If a mode change has not been received, processing continues at step 414 where a location reading is reported based on the current mode of operation. Operation then continues in a loop until the mobile device discontinues operation. If at anytime the mobile device receives a mode change as detected in decision block 412, the reporting mode is changed in accordance with the request at step 416 and the looped operation resumes.

In an exemplary embodiment two reporting modes are utilized. A normal reporting mode is used when the mobile device is not operating within an active mapping zone and a rapid monitoring mode is utilized when the mobile device is within an active mapping zone. In an exemplary embodiment, the difference between the normal reporting mode and the rapid monitoring mode is the timer interval between location readings and or reporting of the location readings to the control system. As a non-limiting example, in the normal reporting mode, the mobile device may obtain and report a location reading once every 30 seconds while in the rapid monitoring mode the interval may be once every second.

It will be appreciated that other reporting modes may also exist. For instance, an active mapping zone may include congested mapping areas and sparse mapping areas. In such a situation, a shorter reporting interval may be used when the mobile device is operating in the congested mapping area and a longer reporting interval when operating in the sparse mapping areas. It will also be appreciated that other criteria may be used to generate the reporting interval other than time. For instance, the speed of the mobile device, direction changes, manual actuations, or other parameters may also be used to establish the reporting interval. However, it will be appreciated that an object of the present invention is that once the mobile device enters into an active mapping zone, that a more frequent or detailed reporting functionality can be enabled as required.

For the control system, at step 430, a location reading is received from a mobile device. In decision block 432, the received location reading is analyzed to determine if it falls within an active mapping zone (AMZ in the figure). If the location reading is within an active mapping zone, the control system sends a request to the mobile device to enter into the rapid monitoring mode at step 434. In addition, if the control system does not have any current mapping information for the active mapping zone 436, it creates a mapping information entry 438 entering the received location reading. The newly created mapping information entry may then be sent to the mobile device, and/or other mobile devices operating within or proximate to the active mapping zone, and/or any mobile device. Processing then continues at step 430 for handling the next location reading.

If at decision block 436 the control system determines that current mapping information exists, the received location reading is used to update the current mapping information. The newly updated mapping information entry may then be sent to the mobile device, and/or other mobile devices operating within the active mapping zone, and/or any mobile device 440. Processing then continues at step 430 for handling the next location reading.

If at decision block 432 the mobile device did not just enter into the active mapping zone, the location reading is examined to determine if the mobile device just exited an active mapping zone 444. If the mobile device just exited an active mapping zone, a request is sent to the mobile device to enter into the normal reporting mode 446 and processing continues at step 430. However, at decision block 444 if the mobile device did not just exit the active mapping zone the processing continues at step 442 to update the current mapping information.

It will be appreciated that although only one mobile device is described in this process flow, actually multiple mobile devices may be operating within the active mapping zone. The control system can received the location readings from the various mobile devices, update the mapping information and optionally provide the updated mapping information to the other mobile devices operating within the active mapping zone.

It will also be appreciated that although the intelligence for identifying when the mobile device is within an active mapping zone has been described as being housed with the control system, this intelligence can easily be incorporated into the mobile device also. In such an embodiment, the mobile device can automatically change reporting modes once it detects that it has entered into an active mapping zone. In addition, the mobile device may be notified that it has entered into an active mapping zone simply be receiving an incomplete map from the control system.

Figure 5:
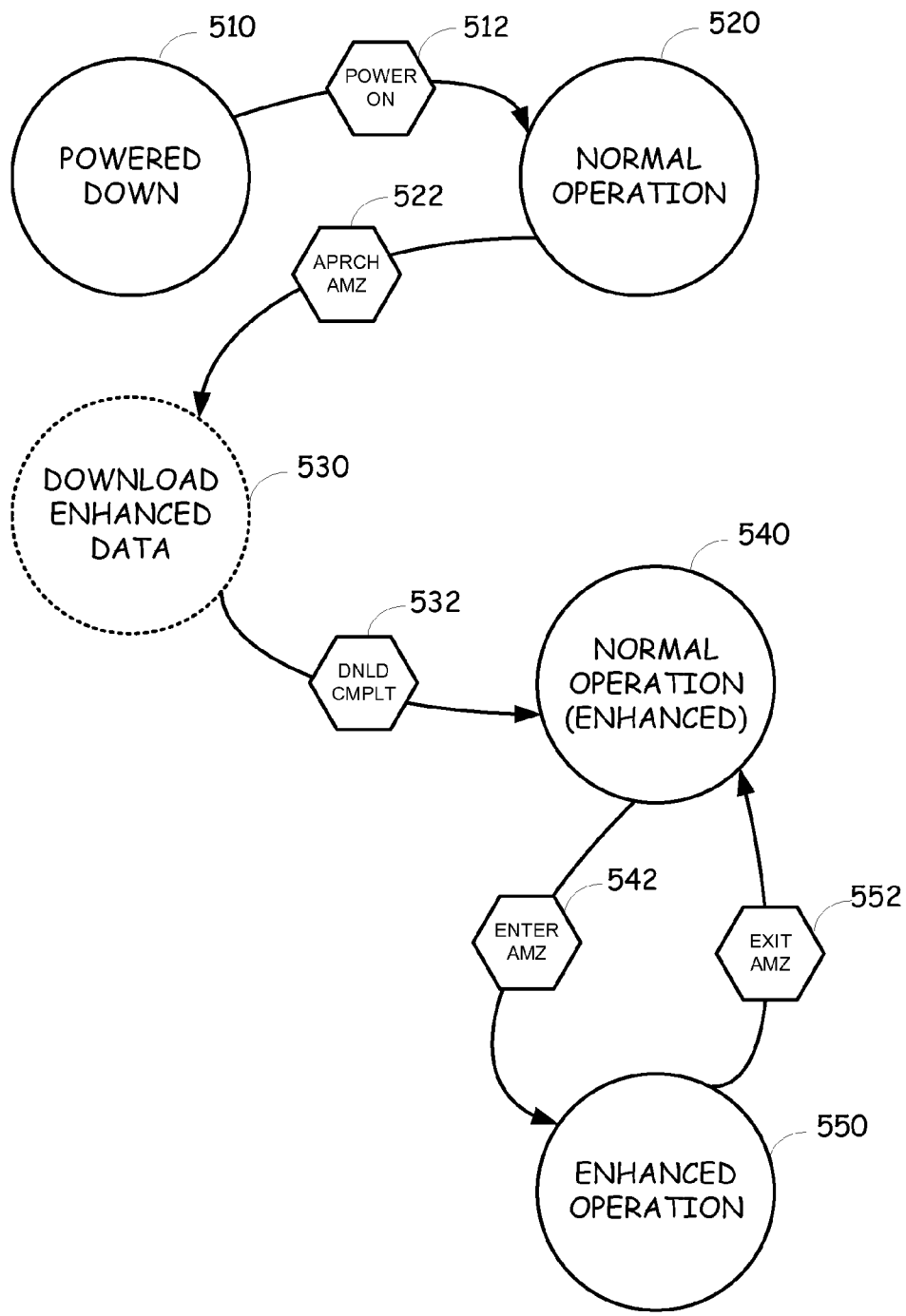
FIG. 5 is a state diagram illustrating the operation of an embodiment of the utilization of the mapping information within a navigational system aspect of the present invention.

FIG. 5 is a state diagram illustrating the operation of an embodiment of the utilization of the mapping information within a navigational system aspect of the present invention. A normal navigational system, typical to those commercially available initially resides in a Powered Down state 510 until it is powered on 512. Once power is applied to the navigational system, it commences operation in the Normal Operation mode 520. In this mode, the navigational device typically receives GPS coordinate information through a GPS receiver, pulls up mapping information pertinent to the received GPS coordinates and displays that information, along with a location indicator on the display of the navigational system.

When the navigational system approaches a region in which the present invention has generated new mapping information 522, such as an active mapping zone (AMZ), the navigational system enters into a transitional mode in which enhanced data is loaded into the navigational device 530. This operation can be triggered based on a variety of circumstance or parameters and the present invention is not limited to any particular embodiment, nor the embodiments described herein for exemplary purposes. In one embodiment, when a navigational system comes within a threshold distance from an active mapping zone, it can be assumed that the probability of entering into the active mapping zone is increased and as such, available enhanced mapping information can be loaded into the navigational system. This enables the navigational system to be ready to display mapping information if the navigational system actually enters into the active mapping zone. Once the download is completed 532, the navigational system resumes normal operation however, it is equipped with enhanced mapping information 540.

From this state, when the navigational system enters into an active mapping region 542, the navigational system begins enhanced operation 550. Enhanced operation means that the navigational system displays the newly generated mapping information for the uncharted or active mapping region to assist the user of the equipment. This information can be displayed instead of the normal mapping information for that region or, it can be overlaid on top of the standard mapping information. In either case, in the enhanced operation mode, the navigational system displays updated mapping information that otherwise would not be available to the navigational system. Thus, a navigational system that is not equipped with this aspect of the present invention would simply display the mapping information 320 as illustrated in FIG. 3A when the navigational system enters into the active mapping region; however, a navigational system equipped with this aspect of the present invention would display the enhanced mapping information as illustrated in FIG. 3G.

Once the navigational system exits the active mapping zone 552, it resumes normal operation but equipped with the enhanced data 540.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or aspects or possible combinations of the features or aspects. Variations of embodiments of the present invention that are described and embodiments of the present invention comprising different combinations of features noted in the described embodiments will occur to persons of skilled in the art. The present invention may be implemented by any one of, or any combination of, software, hardware, and/or firmware. In the description and claims, each of the verbs, "comprise" "include" and "have", and conjugates thereof, are used to indicate that the object or objects of the verb are not necessarily a complete listing of members, components, elements or parts of the subject or subjects of the verb.

What is claimed is:

1. A system for updating and creating mapping information for an active mapping region, the system comprising:
   a control system;
   a plurality of mobile devices with each mobile device including a Global Positioning System (GPS) receiver and a radio transceiver, the mobile device being operable to send location information to the control system over the radio transceiver and to receive mapping information and control signals from the control system over the radio transceiver;
   each of the plurality of mobile devices being operable to:
      periodically obtain a current location reading from the GPS receiver; and
      transmit the current location reading to the control system at a first interval timing and at a second interval timing selected based on a control signal received from the control system, wherein the second interval timing is more frequent than the first interval timing;
   the control system being operable, in response to receiving the current location reading from a first mobile device:
      determine if the current location reading falls within an active mapping zone; and
      in response to a positive determination that the current location reading falls within the active mapping zone, send a control signal to the first mobile device to enter the second interval timing and update mapping information for the active mapping zone with subsequently received location readings.

2. The system of claim 1, wherein the second time interval is around once every second.

3. The system of claim 1, wherein subsequent to determining that the current location reading from the first mobile device is within the active mapping zone, determining that a subsequent current location reading from the first mobile device is outside of the active mapping zone;
   in response to determining that the subsequent current location reading from the first mobile device is outside of the active mapping zone, the control system is further operable to send a control signal to the first mobile device to enter the first interval timing; and
      cease updating the mapping information for the active mapping zone.

4. The system of claim 3, wherein the control system is further operable to, subsequent to determining that the current location reading falls within or near the active mapping zone, send current mapping information for the active mapping zone to the first mobile device.

5. The system of claim 4, further comprising a navigational system that is operable to interface with a mobile device to receive the current mapping information for the active mapping zone.

6. The system of claim 3, wherein the control system can simultaneously receive a current location reading from a second mobile device and if that current location reading is within the active mapping zone, update the mapping information for the current mapping zone and request the second mobile device to enter the second interval timing.

* * * * *